(No Model.)
J. JAQUET.
HEEL SHAVE HOLDER.
No. 261,353. Patented July 18, 1882.
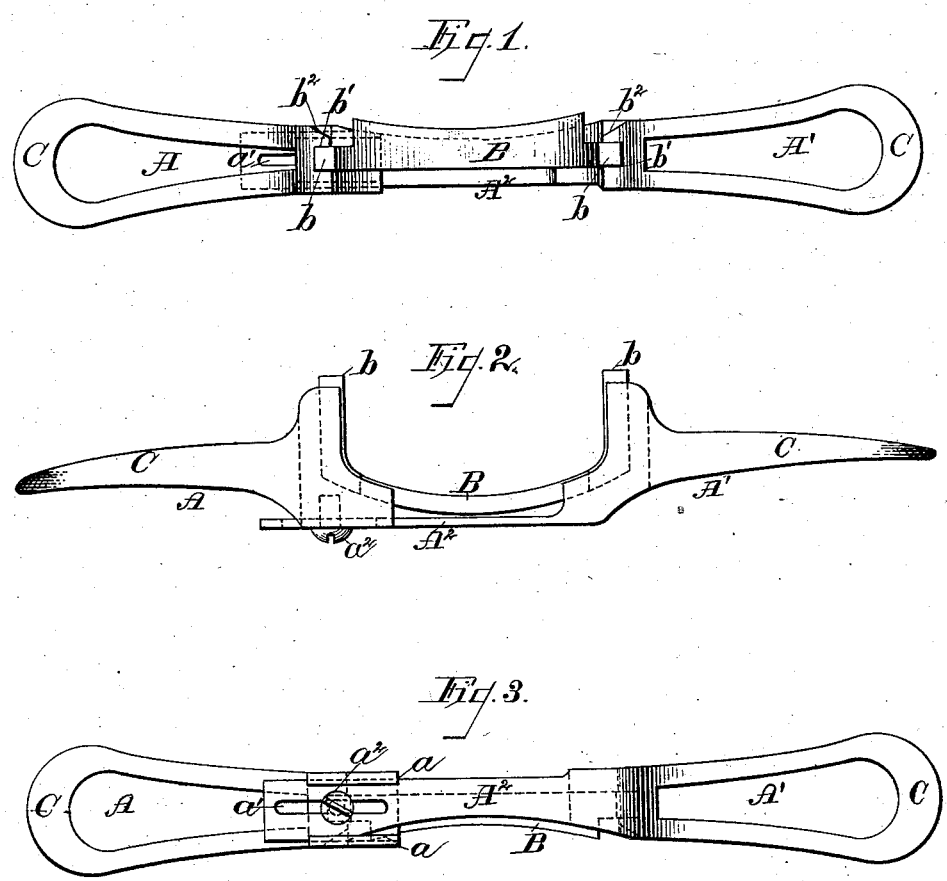
Witnesses:
E. G. Asmus
W. D. Parkinson
Inventor:
Julius Jaquet
By Stout & Underwood
Attorneys.

UNITED STATES PATENT OFFICE.

JULIUS JAQUET, OF MILWAUKEE, WISCONSIN.

HEEL-SHAVE HOLDER.

SPECIFICATION forming part of Letters Patent No. 261,353, dated July 18, 1882.

Application filed February 11, 1882. (No model.)

*To all whom it may concern:*

Be it known that I, JULIUS JAQUET, of Milwaukee, in the county of Milwaukee, and in the State of Wisconsin, have invented certain new and useful Improvements in Heel-Shave Holders; and I do hereby declare that the following is a full, clear, and exact description thereof.

My invention relates to a device for holding the blade of a tool known as a "heel-shave" while it is being sharpened, as will be more particularly set forth hereinafter.

In the drawings, Figure 1 is a top view of my device with the blade of the heel-shave in position to be sharpened. Fig. 2 is a side view, and Fig. 3 is a bottom view, of the same.

My device consists primarily of two parts, A and A', each part composed of a support for the blade and shanks of a heel-shave, and suitable handles, C C.

The part A is the shortest, and is provided with grooved lips $a\, a$ to receive the extended plate $A^2$ of the part A'. This plate $A^2$ has a slot, $a'$, formed in its outer end, whereby it may be adjusted back and forth to adapt my device to receive heel-shave blades of varying lengths, while a set-screw, $a^2$, secures the two parts A and A' firmly together when the blade has been placed between them.

The blade B rests lengthwise on the plate $A^2$, and its shanks $b\, b$ are supported within vertical grooves or recesses $b'\, b'$ in the parts A and A'. These parts are further cut away vertically or beveled, as shown at $b^2\, b^2$, to permit of the readier access of the stone wherewith the blade is sharpened.

When the heel-shave blade requires sharpening it is taken out from its handle and placed in my holder, where it is held firmly in the position desired by means of the grooved lips and set-screw, and it can thus be held firm and true with the greatest ease until it is sharpened, when, by a single turn of the set-screw, it can be instantly released, ready to be replaced in its proper position in the heel-shave.

Having thus described my invention, what I claim as new, and desire to secure by Letters Patent, is—

1. As an improved article of manufacture, a heel-shave holder composed of two parts provided with holding-grooves, one part sliding upon the other and adapted to clamp between them a heel-shave blade and hold it securely in convenient position for sharpening, as set forth.

2. In a heel-shave holder, the part A, provided with grooved lips $a\, a$, and the part A', having slotted adjustable plate $A^2$, adapted to fit within the said grooved lips and to be set at any length required by the set-screw $a^2$, and having suitable recesses to sustain the shanks of a heel-shave blade, as set forth.

In testimony that I claim the foregoing I have hereunto set my hand this 2d day of February, 1882.

JULIUS JAQUET.

Witnesses:
HAROLD G. UNDERWOOD,
CARL PICKHARDT.